H. J. GAISMAN.
METHOD OF AND APPARATUS FOR DESIGNATING PHOTOGRAPHIC EXPOSURES.
APPLICATION FILED SEPT. 12, 1912.

1,396,035.

Patented Nov. 8, 1921.

H. J. GAISMAN.
METHOD OF AND APPARATUS FOR DESIGNATING PHOTOGRAPHIC EXPOSURES.
APPLICATION FILED SEPT. 12, 1912.

1,396,035.

Patented Nov. 8, 1921.
3 SHEETS—SHEET 3.

UNITED STATES PATENT OFFICE.

HENRY J. GAISMAN, OF NEW YORK, N. Y., ASSIGNOR TO EASTMAN KODAK COMPANY, OF ROCHESTER, NEW YORK, A CORPORATION OF NEW YORK.

METHOD OF AND APPARATUS FOR DESIGNATING PHOTOGRAPHIC EXPOSURES.

1,396,035.   Specification of Letters Patent.   Patented Nov. 8, 1921.

Application filed September 12, 1921. Serial No. 719,921.

*To all whom it may concern:*

Be it known that I, HENRY J. GAISMAN, a citizen of the United States, and resident of New York city, borough of Manhattan, in the county of New York and State of New York, have invented certain new and useful Improvements in Methods of and Apparatus for Designating Photographic Exposures, of which the following is a specification.

The object of my invention is to photographically produce desired designations upon the sensitized element within a camera or other photographic apparatus, by means of a translucid member upon which the desired designation is produced, as by manually writing thereon, by permitting the light to pass through such translucid member, independently of exposure through the lens for taking a picture, or by exposure through the lens when an ordinary exposure of the sensitive element is made.

In carrying out my invention I insert a translucid member into a camera and remove it therefrom without permitting light then to strike into the camera with such member, and I permit light to strike through the translucid member directly from the exterior of the camera without regard to the lens, or by shutting off the light from such admission to permit the light to strike through the lens and thence through the translucid member, whereby a designation written upon such translucid member before it is placed within the camera will be caused to be photographed upon the sensitized element contained in the camera.

My invention also contemplates improved means for permitting such translucid member to be moved into and withdrawn from the camera without engaging the sensitive surface of the contained sensitized element, and then to cause such translucid member to be held in close contact with such sensitive surface to prevent light from striking the sensitive surface between the latter and said translucid member.

My invention further comprises novel details of improvement and combinations of parts that will be more fully hereinafter set forth and then pointed out in the claims.

Reference is to be had to the accompanying drawings forming part hereof, wherein.

Similar numerals of reference indicate corresponding parts in the several views.

Figures 1, 2, 3, 4, 5:
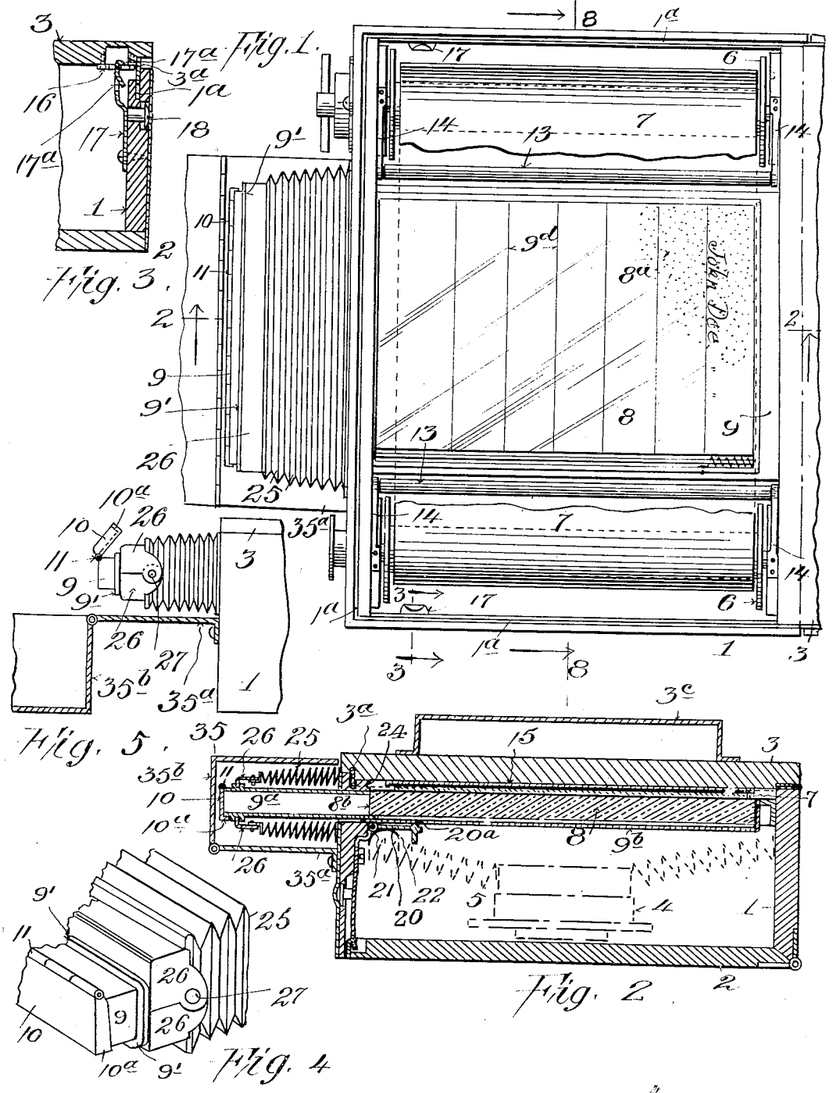
Figure 1 is a partly broken plan view of a camera embodying my improvements, the cover being laid back and partly broken away.
Fig. 2 is a cross section on the line 2, 2, in Fig. 1, showing the cover in place.
Fig. 3 is a detail section, enlarged, on the line 3, 3, in Fig. 1.
Fig. 4 is a detail perspective view illustrating the expansible pocket or bellows and shutter for the translucid member.
Fig. 5 is a detail end view illustrating the expansible pocket uncovered.
Figures 6, 7, 14, 15:
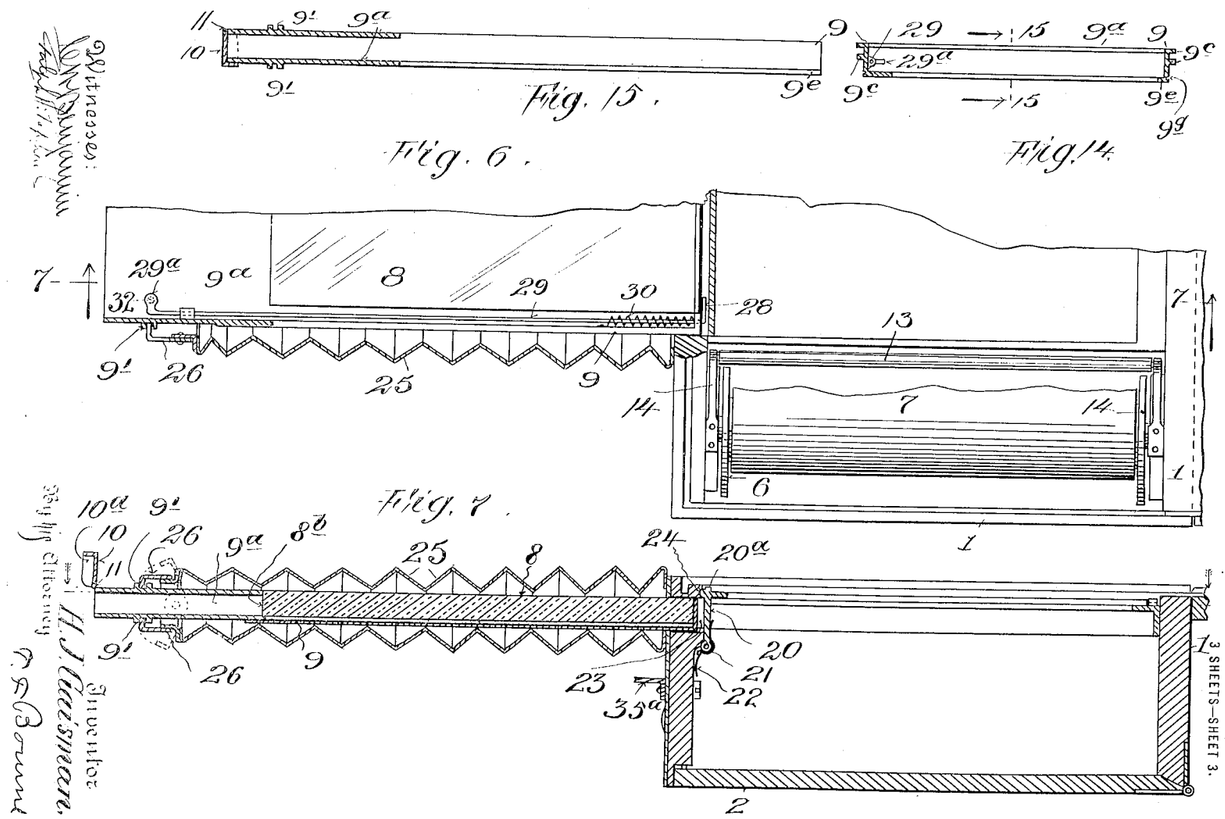
Fig. 6 is a partly sectional plan view of a portion of the camera, showing the expansible pocket pulled out and containing the translucid member.
Fig. 7 is a section on the line 7, 7, in Fig. 6.
Fig. 14 is a cross section of holder 9 showing its bottom plate 9$^a$ removed.
Fig. 15 is a section on the line 15, 15 in Fig. 14.
Figure 8:
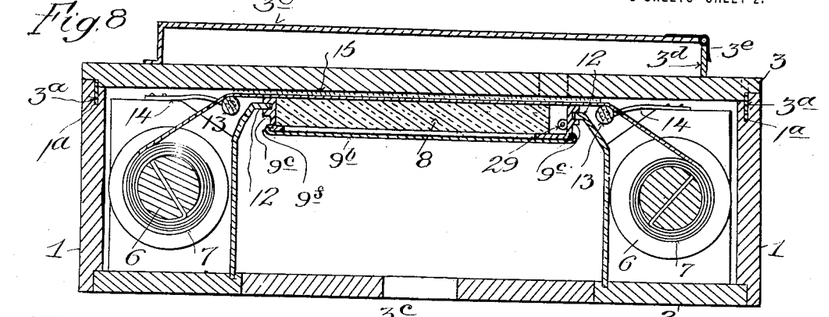
Fig. 8 is a section on the line 8, 8, in Fig. 1.
Figure 9:
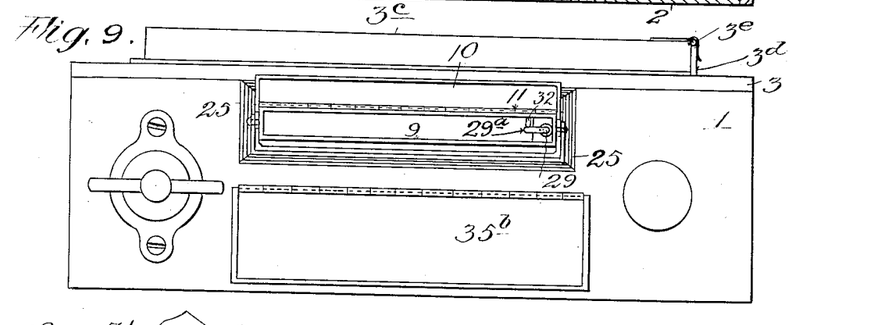
Fig. 9 is an end view of the camera looking from the left in Fig. 2 showing the parts 10 and 35 opened.

The camera or photographic apparatus illustrated in the accompanying drawings comprises a frame 1 having covers 2, 3, hinged in a well known manner, and adapted to contain a lens 4 connected with the bellows 5 secured within the frame, and said camera frame is provided with means for rotatively supporting the spools 6 carrying a sensitized element, such as a flexible film 7, all of which parts may be of any well known construction, my improvements hereinafter described being applicable for use in connection with cameras or photographic apparatus adapted to contain sensitized elements, such as plates or flexible films having sensitized surfaces. At 8 is a translucid member, such as a plate or bar of glass, celluloid or other corresponding material, upon which designations may be produced and retained as desired, such as by writing thereon, and through which light may pass, the surface of which material may be suitably roughened in any well known manner, to permit writing thereon, as with a pencil, to retain the marks written, for which purpose the surface of member 8 may be roughened as at 8ª, Fig. 1, in the nature of ground glass. The member 8 is adapted to be placed within the camera in front of a portion of the sensitive surface of the contained sensitized element 7. Photographing upon the sensitive surface of the designation written upon member 8, may be accomplished by permitting the light when required to strike through member 8 from the exterior of the camera or from the lens 4. To such ends I have shown a holder, frame or trough 9 adapted to receive member 8, and shown having ledges 9ᵉ upon which said member rests, said holder being open on its upper side or on the side opposed to element 7, the bottom 9ᵇ of holder 9 and the sides of the holder around member 8 serving to prevent light from striking through member 8 from within the camera. Bottom 9ᵇ of holder 9 is shown as removable from the holder, being shown supported by its bent edges 9ᶠ to slide in guides 9ᵍ of the side arms of the holder (Fig. 12), whereby said bottom may be removed when it is desired to permit light from within the camera to strike through member 8 against the sensitized surface of element 7. At one end holder 9 is provided with a hollow but entirely covered chamber or compartment 9ª communicating with the adjacent edge 8ᵇ of member 8 (Fig. 7) which is adapted to fit closely against the compartment 9ª (Figs. 2 and 7). The outer open end of the compartment 9ª is shown provided with a shutter 10 pivotally supported at 11 upon holder 9, and shown provided with the flanged portions 10ª to fit over the outer end of compartment 9ª to normally prevent the entrance of light and admit light when required. Holder 9 is slidably supported to be pushed into and pulled out of frame 1, for which purpose holder 9 is shown provided at opposite edges with guiding grooves 9ᶜ adapted to engage spaced guides 12 suitably supported within frame 1 (see Fig. 8), and so located that the outer face of member 8 will be close to the sensitive surface of element 7. To keep member 8 from engaging said surface when being pushed into or pulled out of the camera, and yet to permit said member to closely engage said sensitive surface when the designation upon member 8 is to be photographed upon such sensitized element, the camera is provided with means to move the sensitive surface into contact with such member when the latter is in the desired position within the camera. To this end I have shown guiding rollers 13 for element 7 supported upon spring-like arms 14 secured within the camera frame, and having a normal outward spring tendency serving normally to raise the element 7 out of contact with member 8. The cover 3, when placed in final operating position, is adapted to push element 7 into contact with member 8, and to this end cover 3 is so located over the exposure portion of element 7, between the supporting rollers 13, as to push such portion of element 7 into engagement with member 8 (see Fig. 8). I have shown a pad 15, which may be of suitable relatively soft or flexible material, such as felt, secured on the inner face of cover 3 to engage the back of element 7. Cover 3 is shown provided with flanges 3ª adapted to enter corresponding grooves 1ª in the walls of frame 1 (Figs. 3 and 8), to exclude light from the camera when cover 3 is partly or wholly in place. To retain cover 3 in close contact with element 7 in the operating position, and also to retain said cover closed upon the camera frame but raised so that element 7 may be out of contact with member 8, when the latter is moved in and out of the camera, I have shown cover 3 provided with an apertured catch plate 16 (Fig. 3) adapted to engage the several spaced projections 17ª of the catch spring 17 secured to frame 1, a button 18 carried by frame 1, adapted to engage catch 17, enabling disengagement of said catch from plate 16 when required. The arrangement is such that cover 3 may be raised slightly and retained in such position without causing the flanges 3ª to pass out of the grooves 1ª while member 8 is being inserted and removed, and that when exposure is to be made cover 3 may be pushed inward to cause the sensitive surface of element 7 to engage member 8.

To prevent light from entering the camera with the member 8 when the latter is being pushed into the camera, or removed therefrom, I provide a shutter 20 (Figs. 2 and 7) shown hinged at 21 within frame 1, and normally pressed by a spring 22 to close opening 23 in frame 1, (Fig. 7), through which member 8 and its holder 9 are inserted into the camera. Shutter 20 is preferably provided with a rib 20ª (Fig. 7) to engage a corresponding groove 24 within the camera to aid in excluding light when said shutter is closed. To further exclude light from the camera around opening 23 I provide an extensible pocket, shown as a bellows 25, of suitable flexible material, suitably secured upon the exterior of frame 1 in front of and around opening 23, and adapted to receive member 8 and its holder 9, the outer end of which bellows is provided with jaws 26 shown pivoted together at 27, and adapted to close in box-like form (Fig. 5) upon the outer portion of compartment 9ª of holder 9, which compartment 9ª is shown provided with grooved members or recesses 9′ to receive the edges of jaws 26, whereby holder 9 is detachably connected with the bellows. The arrangement is such that when plate 8 is placed in holder 9, the latter may be passed through the outer open end of the bellows, and the jaws 26 closed upon the holder 9 (shutter 10 having been closed) and then the holder 9 is pushed into the camera (bellows 25 collapsing); said holder will push shutter 20 aside (Fig. 2) and member 8 may thus be pushed into the camera so far as desired in front of the sensitive surface of element 7, cover 3 being at such time slightly raised. Cover 3 may then be lowered to cause engagement of said sensitive surface with member 8. To prevent holder 9 from being pushed into the camera frame when bellows 25 is not pulled out sufficiently far to enable jaws 26 to be closed upon the parts 9' of frame 9, and to prevent shutter 20 from being pushed aside by holder 9 if the latter is not properly connected with the bellows, I provide a stop 28 on holder 9 normally projecting upwardly from said holder (Fig. 10) in position to engage the outer wall of the camera, said stop being shown carried upon a rod 29 journaled in bearings in holder 9 and normally held by a coil spring 30 with stop 28 projecting upwardly, said rod having a laterally disposed finger 29$^a$ shown located in compartment 9$^a$ and beneath opening 31 of said compartment, one of the jaws 26 having a pin 32 (Fig. 13) adapted to pass through opening 31 to engage and press down finger 29$^a$ when a jaw 26 is closed, thereby to turn stop 28 downwardly in front of frame 1 and permit holder 9 to be pushed through opening 23. If attempt should be made to insert holder 9 into the casing without causing pin 31 to operate stop 28 as stated, said stop will prevent insertion of holder 9 into the camera, hence bellows 25 must be pulled out the proper distance to cause pin 32 to pass through opening 31 to operate stop 28, as stated.

Figures 10, 11, 12, 13:
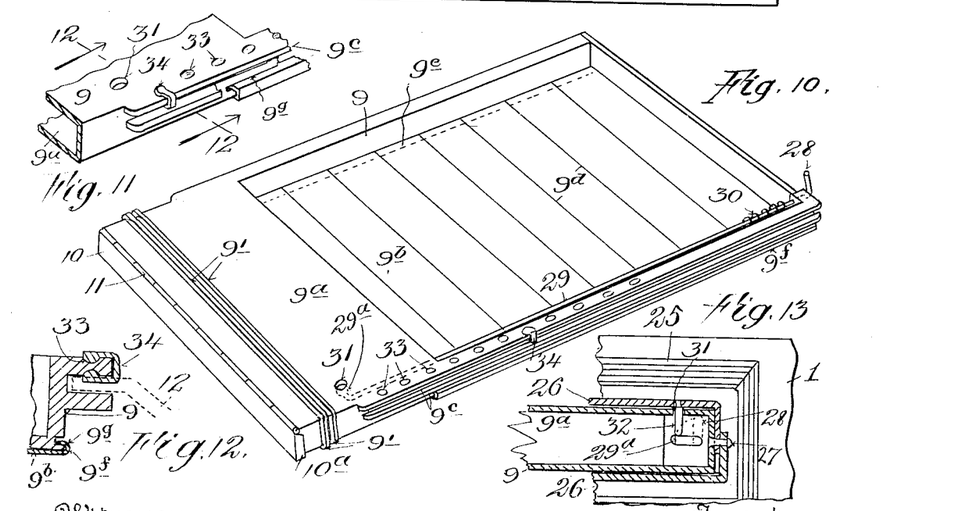
Fig. 10 is a perspective view of the holder or frame for the translucid member.
Fig. 11 is an enlarged detail of part of Fig. 10.
Fig. 12 is an enlarged section on the line 12, 12, in Fig. 11.
Fig. 13 is an enlarged sectional detail.

In order to determine accurately the extent to which holder 9 is pushed into the camera at any desired time, I have shown said holder provided with a series of spaced openings or recesses 33 along one edge, adapted to receive clip 34 (Figs. 10, 11 and 12), which clip may be adjusted along holder 9 to the desired position, so that such clip will engage frame 1 and limit inward movement of holder 9 as desired. The bottom wall of holder 9 may be provided with lines 9$^d$, which may be seen through the translucid plate or member 8, as a guide in writing upon the latter (Figs. 1 and 10). To protect bellows 25 and its attached parts when not in use, I have shown a housing 35 secured upon the exterior of the camera to close over the collapsed bellows. Said housing is shown comprising a base 35$^a$ secured upon the camera, and a hinged portion 35$^b$ having closed sides and ends adapted to fold over the bellows, as shown in Fig. 2, and to be folded outwardly as shown in Fig. 5, to permit operation of the bellows.

Cover 3 is shown provided with a chamber 3$^c$ on its outer side adapted to contain holder 9 and plate 8, when the latter are not to be used, which chamber is shown provided with a hinged wall 3$^d$ to permit entrance of holder 9. A spring 3$^e$ operating against wall 3$^d$, as in Fig. 8, retains wall 3$^d$ closed.

Instead of having holder 9 closed at the bottom, where it receives the translucid member 8, (thereby requiring light to strike through the compartment 9$^a$ when shutter 10 is opened) said holder may be open on the top and bottom, and on its inner end, as shown in Figs. 14 and 15, whereby light may strike through member 8 from the lens when the usual exposure is made through the latter for taking a picture.

In accordance with my invention, (using the holder or frame 9 having the closed sides and bottom with open top with the translucid member 8 therein), the desired designation such as a name, date, initials, object photographed, or the like, is written upon member 8, at a suitable part thereof, (as near the edge to be first placed into the camera), the shutter 10 is closed, (the shutter 20 being normally closed against opening 23), the jaws 26 are opened, holder 9 with the contained member 8 are then inserted in the outer open end of the bellows, jaws 26 are closed upon holder 9, stop 28 being thereby lowered, cover 3 is raised slightly, as indicated in Fig. 3, and holder 9 and plate 8 are then pushed inwardly into the camera in front of a desired portion of the sensitive surface of element 7, and cover 3 is then closed tightly to cause the sensitive surface of said element 7 to be pressed against member 8. A preferred manner of photographing will be to admit light to the camera through the photographing lens to photograph the object desired upon the portion of element 7 that is not obstructed by holder 9 in the ordinary manner, and then shutter 10 will be opened and closed allowing the desired time exposure. The light that strikes through chamber or compartment 9$^a$ and through translucid member 8 causes the writing upon the latter to be photographed upon said sensitized element without regard to the use of the photographic lens 4. The writing upon member 8 will thus be photographed upon the sensitive surface of element 7, within a mortise or relatively light-struck portion of said sensitive surface, whereby the writing will be clearly defined and kept from mingling with the picture photographed upon element 7 because of the bottom 9$^a$ closing holder 9. Such designation photographed upon element 7 will be adjacent to the picture photographed thereon. Photographing through lens 4 upon the sensitive surface of element 7 (adjacent to the part of such sensitive surface that was exposed to the action of the light through member 8 as stated) is prevented by reason of the opacity of holder 9 and the fact that plate 8 is held in firm contact with the sensitive surface of element 7 to prevent light from striking between the latter and said plate. Member 8 may be pushed into the camera to any desired extent, thereby leaving a desired portion of the element 7 to be exposed to the lens 4 adjacent to the designation photographed upon the sensitized element 7. It will be understood, however, that, if desired, after member 8 has been placed in position in front of the sensitive element 7 as stated, and before the object has been photographed through the lens upon the portion of the sentitized element unobstructed by holder 9 and member 8, the shutter 10 may be opened and closed allowing desired time exposure, to cause photographing the designation upon the portion of element 7 in front of member 8 and holder 9, and then exposure may be made through the lens upon the portion of element 7 that is not obstructed by holder 9, and before element 7 is moved. Member 8 may be left in place for photographing the designation thereon upon any desired consecutive number of pictures, or may be removed and replaced as desired, with the same or different designations produced thereon.

In Figs. 14 and 15 holder 9 is represented as having its bottom 9$^b$ removed and its inner end open, the holder thus being in skeleton form beyond compartment 9$^a$. With member 8 placed in the holder as above stated, and the holder and member 8 placed in the camera, the light may strike through member 8 from the lens 4 when usual exposure of element 7 is made, and without opening shutter 10, whereupon the picture and the designation upon member 8 will be simultaneously photographed on the sensitized element, since the light then will strike from lens 4 not only directly upon the portion of the surface of sensitized element 7 exposed to the lens, but through member 8 as well, thereby photographing such designation upon the sensitized element, which designation, however, will be more or less involved in the picture taken according to the translucidity of member 8. When holder 9 with member 8 is pulled out of the camera, and before they are removed from bellows 25, the shutter 20 will automatically close opening 23, as soon as removed from the pressure of holder 9, to prevent entrance of light to the camera through opening 23 when holder 9 is removed from bellows 25, and the camera then may be used in the ordinary manner.

In the present embodiment of my invention, the face of the translucent tablet 8 is covered by the bellows 25 which prevents the passage of light through the tablet to the interior of the camera during the movement of the tablet frame through the opening in the aperture in the side of the camera, and while this particular construction is advantageous when the tablet is relatively long as compared with the thickness of the solid walls of the camera casing, my invention comprehends any suitable means for excluding the light during these movements, whether in the form of a bellows as shown, or not.

By means of my invention it will be apparent that the photographer is enabled readily to cause photographing upon the sensitized element of any designation he desires that is produced upon translucid member 8, and that he may use the same designation, such as a date, place, name or the like, for any desired consecutive photographs, or may change such designations by removing member 8 and writing new designations thereon, as frequently as desired.

By causing the designation upon the surface of translucid member 8 to be held in contact with the sensitive surface of element 7 when the latter is held against member 8, and by preventing the light from striking through member 8 into the interior of the camera, from the opening in the outer end of holder 10, I am enabled to cause such designation to be photographed upon such sensitive surface when shutter 10 is opened, because then the light striking through translucid member 8 is, at such designation, prevented from striking the sensitive surface, according to the density or opacity of such designation, thereby producing a superior photograph of the designation upon the sensitive element. When, however, the light passes through translucid member 8 from within the camera, (from the photographic lens) without passing through shutter 10, it is advantageous to have the designation in contact with the sensitive surface of element 7 in order to produce sharper photographic lines upon element 7 than if the designations were not in contact with the sensitive surface.

It will be understood, that after the sensitized element 7 has been exposed to the light, to photograph the designation or picture, or both, thereon, said element will be developed in any well known manner for printing pictures therefrom.

I have used the term "translucid" as meaning a member or plate 8 of any suitable material other than opaque, and which will be sufficiently transparent or translucent to allow the light to strike through the same to photograph the designation thereon upon the senstive surface of element 7.

By the term "sensitized element" as used herein I mean any suitable plate, celluloid, paper, or other film, commonly employed for photographing, which is sensitized photographically or, sensitive to actinic rays of light.

It is, of course, immaterial whether the apparatus containing my invention is strictly speaking a camera, that is, whether or not it contains a lens and shutter as part of the permanent structure, as the device is primarily a holder for photographic sensitive material as film, and all the operative parts could as well be embodied in a separate structure adapted to be applied to any of the well known cameras, and, therefore, the term "camera" as used in the claims is to be understood as meaning a device adapted to hold photographic material so that it may be exposed in the usual way.

It will be understood also that when the designations on the translucid member 8 are intended to be light printed on the film by light admitted through the open end of the holder 9, it is essential that the material of which the member 8 is composed be of such nature that sufficient actinic light will travel or be transmitted longitudinally of the member and pass to the film beneath the designations formed on its surface and ordinary plate or window glass is found to be efficient for the purpose.

The term "photographing", when used in the specification and claims to describe recording the designations on the film, is intended to mean light printing by the uneven passage of actinic light onto the sensitized element, due to the masking effect produced by the more or less opaque designations on the translucid member.

Having now described my invention what I claim is:—

1. The combination with a camera having an opening, means upon the camera to normally close said opening, and an expansible pocket upon and without the camera and communicating with said opening, of a holder adapted to pass through said opening and pocket, a translucid member fitted to said holder supported adjacent the film and adapted to receive markings to be light printed on the film, and means to admit light at will through said member.

2. The combination with a camera having an opening, means upon the camera to normally close said opening, and an expansible pocket upon and without the camera and communicating with said opening, of a holder adapted to pass through said opening and pocket, a translucid member fitted to said holder supported adjacent the film and adapted to receive markings to be light printed on the film, means to detachably connect said pocket with said holder to prevent light passing into the camera through said pocket, and means to admit light at will to said member.

3. The combination with a camera having an opening, means upon the camera to normally close said opening, and an expansible pocket upon and without the camera and communicating with said opening, of a holder adapted to pass through said opening and pocket, a translucid member fitted to said holder supported adjacent the film and adapted to receive markings to be light printed on the film, and a shutter upon said holder to admit light at will to said member.

4. The combination with a camera having an opening, means upon the camera to normally close said opening, and an expansible pocket upon and without the camera and communicating with said opening, of a holder adapted to pass through said opening and pocket, a translucid member fitted to said holder supported adjacent the film and adapted to receive markings to be light printed on the film, said holder having a hollow compartment, and a shutter to control the passage of light through said holder.

5. The combination with a camera having an opening, a shutter within the camera to normally close said opening, a spring normally holding said shutter closed, and an expansible pocket upon and without the camera and communicating with said opening, of a holder adapted to pass through said opening and pocket, a translucid member fitted to said holder supported adjacent the film and adapted to receive markings to be light printed on the film, and means to admit light at will through said member.

6. The combination with a camera having an opening, a shutter within the camera to normally close said opening, a spring normally holding said shutter closed, and an expansible pocket upon and without the camera and communicating with said opening, of a holder adapted to pass through said opening and pocket, a translucid member fitted to said holder supported adjacent the film and adapted to receive markings to be light printed on the film, and means to admit light at will through said member, said holder having a movable stop to control the entrance of the holder into the camera, and means to operate said stop.

7. The combination with a camera having an opening, a shutter within the camera to normally close said opening, a spring normally holding said shutter closed, and an expansible pocket upon and without the camera and communicating with said opening, of a holder adapted to pass through said opening and pocket, a translucid member fitted to said holder supported adjacent the film and adapted to receive markings to be light printed on the film, means to admit light at will through said member, said holder having a movable stop to control the entrance of the holder into the camera, said pocket having means to close upon the holder to exclude light from the pocket, and means to rotate said stop to permit the holder to enter the camera through said opening.

8. The combination with a camera having an opening, a shutter within the camera to normally close said opening, a spring normally holding said shutter closed, and an expansible pocket upon and without the camera and communicating with said opening, of a holder adapted to pass through said opening and pocket, a translucid member fitted to said holder supported adjacent the film and adapted to receive markings to be light printed on the film, and means to admit light at will through said member, said holder having a movable stop to control the entrance of the holder into the camera, said pocket having jaws to close upon said holder and exclude light from the pocket, said jaws having means to operate said stop and permit the holder to enter the camera.

9. The combination with a camera having an opening, a shutter within the camera to normally close said opening, a spring normally holding said shutter closed, and an expansible pocket upon and without the camera and communicating with said opening, of a holder adapted to pass through said opening and pocket, a translucid member fitted to said holder supported adjacent the film and adapted to receive markings to be light printed on the film, means to admit light at will through said member, said holder having a movable stop to control the entrance of the holder into the camera, said pocket having jaws to close upon said holder and exclude light from the pocket, said holder having an opening opposed to said stop, one of said jaws having a projection to pass through said opening and operate said stop.

10. The combination with a camera having an opening, a shutter within the camera to normally close said opening, a spring normally holding said shutter closed, and an expansible pocket upon and without the camera and communicating with said opening, of a holder adapted to pass through said opening and pocket, a translucid member fitted to said holder supported adjacent the film and adapted to receive markings to be light printed on the film and means to admit light at will through said member, said holder having a rod journaled therein and provided at its inner end with a stop to control the entrance of the holder into the camera, said rod at its outer end having a projection, said holder having an opening opposed to said projection, said pocket being provided with jaws to close upon the holder, one of said jaws having a projection to pass through said opening in the holder to operate the projection of said rod.

11. The combination with a camera provided with an opening, of a holder adapted to enter said opening, means for preventing the entrance of light to the camera when the holder is removed, said holder having means to retain a translucid member and provided with a bottom, a translucid member in the holder adapted to receive markings and arranged adjacent the sensitized element in the camera, and means to admit light at will through said member.

12. The combination with a casing or holder for sensitized photographic material, having an opening therein of a holder for translucid material, provided with a removable bottom and adapted to be inserted in the opening in the casing in front of the sensitized material, means for preventing the passage of light through the opening and means for admitting light to said member through the holder.

13. The combination with a casing or holder for sensitized photographic material, having an opening therein, a holder for translucid material provided with a removable bottom arranged, adjacent the sensitized material, and having a compartment at its outer end and a removable cover for said compartment and means for preventing the passage of light through the opening around the holder.

14. The combination with a camera provided with an opening, of a holder adapted to enter said opening, said holder having side members provided with ledges to support a translucid member adapted to receive markings to be light printed upon a film and also having a compartment open at opposite ends, a translucid member fitted to said holder adjacent the inner end of said compartment and adjacent the film, means for preventing the passage of light through the opening around the holder, and a shutter to control the admission of light to said member through said compartment.

15. The combination with a camera provided with an opening, of a holder adapted to enter said opening, said holder having a bottom and side members provided with ledges to support a translucid member adapted to receive markings to be light printed upon a film and having a compartment open at opposite ends, a translucid member fitted to said holder adjacent the inner end of said compartment and adjacent the film, means for preventing the passage of light through the opening around the holder, and a shutter to control the admission of light to said member through said compartment, said bottom being detachably connected with said holder.

16. The combination with a camera having an opening, of a holder adapted to be moved into said opening having a compartment and side members projecting therefrom and spaced apart, said side members being provided with means to retain adjacent the film a translucid member adapted to receive markings to be light printed upon a film, means for preventing the passage of light through the opening around the holder and a shutter to control admission of light through said compartment.

17. The combination with a camera having an opening, of a holder movable in said opening having a compartment and side members projecting therefrom and spaced apart, said side members being provided with means to retain adjacent the film a translucid member adapted to receive markings to be light printed upon a film, means for preventing the passage of light through the opening around the holder, and a shutter to control admission of light through said compartment, said holder having a bottom opposed to said translucid member.

18. The combination with a camera having an opening, of a holder movable in said opening having a compartment and side members projecting therefrom and spaced apart, said side members being provided with means to retain adjacent the film a translucid member adapted to receive markings to be light printed upon a film, means for preventing the passage of light through the opening around the holder and a shutter to control admission of light through said compartment, said holder having a bottom opposed to said translucid member, said bottom being detachably connected with said holder.

19. The combination with a camera provided with an opening, of a flexible pocket outside the camera with its interior communicating with said opening, a holder for a translucid member adapted to receive markings to be light printed upon a film in the camera when adjacent thereto, said holder and member being adapted to pass through said pocket and opening to place the member adjacent the film and a housing upon the camera adapted to inclose said pocket.

20. The combination with a camera provided with an opening, a flexible pocket outside the camera with its interior communicating with said opening, a holder for a translucid member adapted to receive markings to be light printed upon a film in the camera when adjacent thereto, said holder and member being adapted to pass through said pocket and opening, and a housing upon the camera adapted to inclose said pocket, said housing having a movable wall to permit the pocket to be drawn outwardly.

21. The combination with a camera having an opening, of a holder for a translucid member adapted to pass through said opening and in proximity to the sensitized element, means for preventing the passage of light around the holder, said holder being provided with an adjustable stop to regulate the entrance of said holder into the camera, a translucid member fitted to said holder and adapted to receive markings to be light printed on the film when adjacent the latter, and means to control the passage of light through said translucid member.

22. The combination with a camera having an opening, of a holder for a translucid member adapted to pass through said opening and in proximity to the sensitized element, means for preventing the passage of light around the holder, said holder being provided with a clip, means to retain the clip in adjusted position upon the holder to regulate the entrance of the holder into the camera, a translucid member fitted to said holder and adapted to receive markings to be light printed on the film, and means to control the passage of light through the translucid member.

23. The combination with a camera having an opening, of a holder for a translucid member adapted to pass through said opening and in proximity to the sensitized element, means for preventing the passage of light around the holder, said holder being provided with spaced holes, a clip adapted to fit said holes to regulate the admission of the holder into the camera, a translucid member fitted to said holder and adapted to receive markings to be light printed on the film, and means to control the passage of light through said member.

24. The combination with a camera having an opening, of a holder for a translucid member adapted to receive markings to be light printed upon a film adapted to pass through said opening and into proximity to the sensitized element, means for preventing the passage of light around the holder, means within the camera slidably supporting said holder, and means to control the passage of light through said member.

25. The combination with a camera having an opening, of a holder adapted to contain a translucid member adapted to receive markings to be printed upon a film, said holder being adapted to pass through said opening and hold the member in proximity to the film, guides within the camera slidably supporting said holder, means for preventing the passage of light around the holder, and means to control the passage of light through said member.

26. The combination with a camera having means to support a sensitized element therein, of a translucid member movable into and from the camera independently of the element, means for placing said member in close contact with the sensitized surface of said element and means for controlling the passage of light to said member.

27. The combination with a camera having means to support a sensitized element therein, of a support within the camera, a translucid member on said support having a designation upon its face in contact with the sensitive surface of said element, and means to admit light from the outside through said member, and means to prevent light from within the camera from striking through said member against said sensitive surface.

28. The combination with a camera having means to support a sensitized element therein, and a support within the camera, of a translucid member on said support having a designation upon its face in contact with the sensitive surface of said element, means to prevent light from within the camera from striking through said translucid member against said sensitive surface, and means to admit light from the exterior of the camera through said translucid member and to prevent light from the translucid member from striking the sensitive surface of said element not opposed to said member.

29. The combination with a camera having means to support a sensitized element therein, and a support within the camera a translucid member on said support having a designation upon its face in contact with the sensitive surface of said element, means to prevent light from within the camera from striking through said translucid member against said sensitive surface, and means to admit light from the exterior of the camera through said translucid member and to prevent light from the translucid member from striking the sensitive surface of said element not opposed to said member, the designation upon the translucid member being held in contact with the sensitive surface of said element to prevent light from striking the sensitive surface opposed to the markings on the member.

30. The combination with a camera, a support, and a translucid member thereon, said translucid member being adapted to retain designations produced thereon, of means to support a sensitized element within the camera opposed to the designations on said member, means within the camera to hold the designations on said member in contact with the sensitive surface of said element, and means to admit light through said element to cause said designations to be light printed upon said element.

31. The combination with a camera, a support and a translucid member on said support within said camera of means to support a sensitized element within the camera opposed to said member and out of contact therewith, means to move said element into contact with said member, and means to admit light through said member.

32. The combination with a camera, a support and a translucid member on said support within the camera with means to support a sensitized element within the camera opposed to said member and out of contact therewith, said camera having a movable cover, means to maintain said element between said member and cover and out of contact with said member, means to hold the cover upon said element with the latter in contact with said member and means to admit light through said member.

33. The combination with a camera, a support therein and a translucid member on said support of means to support a sensitized element within the camera opposed to said member, means separate from the supporting means for said element to maintain the latter out of contact with said member, means to hold said element in contact with said member and means to admit light through said member.

34. The combination with a camera, a support within the camera and a translucid member thereon, of means to support a sensitized element within the camera opposed to said member, means separate from the supporting means for said element to maintain the latter out of contact with said member, said camera having a movable cover opposed to said member, means to cause said cover to hold said element in contact with said member, and means to admit light through said member.

35. The combination with a camera, a support within the camera and a translucid member thereon, of means to support a sensitized element within the camera opposed to said member, means separate from the supporting means for said element to maintain the latter out of contact with said member, said camera having a movable cover opposed to said member, means to hold said cover upon said element with the latter in contact with said member and to maintain said cover away from said member with said element out of contact with the latter, and means to admit light through said member, 36. The combination with a camera, a support therein and a translucid member thereon, of means to support a sensitized element within the camera opposed to said member, means separate from the supporting means for said element to maintain the latter out of contact with said member, said camera having a movable cover opposed to said member, a catch device having a member upon the cover and a member upon the camera to maintain the cover pressing the element upon said member and the cover raised with the member out of contact with the latter, and means to admit light through said member.

37. The combination with a camera, and a translucid member supported therein, of means to support a sensitized element within the camera with a portion opposed to said member, spring-acting supporting means for said element to normally maintain the latter out of contact with said member, means to hold a portion of said element against said member, and means to admit light through said member.

38. The combination with a camera, and a translucid member supported therein, of means to support element, means on opposite sides of a flexible sensitized member to retain said element with a portion thereof opposed to said member, spring-acting means on opposite sides of said member to raise said element therefrom, a cover movably carried by the camera over said member and the portion of said element thereon, means to retain said cover pressing said element upon said cover and means to admit light through said member.

39. The combination with a camera, and a translucid member supported therein, of means on opposite sides of a flexible sensitized member to retain said element with a portion thereof opposed to said member, spring-acting means on opposite sides of said member to raise said element therefrom, a a cover movably carried by the camera over said member and the portion of said element thereon, means to retain said cover pressing said element upon said cover, means to retain said cover raised with said element out of contact with said member and means to admit light through said member.

40. The combination with a camera, and a translucid member supported therein, of means on opposite sides of a flexible sensitized member to retain said element with a portion thereof opposed to said member, spring-acting means on opposite sides of said member to raise said element thereform, a cover movably carried by the camera over said member and the portion of said element thereon, means to retain said cover pressing said element upon said cover, means to retain said cover raised with said element out of contact with said member, a piece of soft material between said cover and element to bear on said element, and means to admit light through said member.

41. The combination with a camera having a photographic lens, of a translucid member, a holder for said member provided with spaced arms having means to support said member, and means to support a sensitized element opposed to said member on the side thereof most distant from said lens.

42. The combination with a camera having a photographic lens, of a translucid member, a holder for said member provided with spaced arms having means to support said member, means to support a sensitized element opposed to said member on the side thereof most distant from said lens, means to maintain said element out of contact with said member, and means to hold said element in contact with said member.

43. The combination with a camera having an opening and provided with a lens, of a translucid member adapted to receive markings to be light printed on the film, a holder for said member adapted to pass through said opening and having spaced arms provided with means to support said member, means to admit light through said holder to said member at will, means to support a portion of a sensitized element opposed to said member at a distance therefrom, and means to hold said element in contact with said member.

44. The combination with a camera having means to support a sensitized element therein, of means to support a designation in contact with the opposed surfaces of said element to permit such designation to be light printed upon said element while in contact therewith by the light passing through the camera lens, and means to light print the designation upon said element otherwise than by light passing through the camera lens.

45. The method of producing a picture negative and an additional designation upon different portions of the same light sensitive photographic element while contained in a holder, consisting in exposing a portion of said element to reflected light from a subject through an aperture to form the picture negative, and exposing another portion thereof to light admitted independently of the picture taking aperture and passing through a translucid member bearing said additional designations.

46. The method of producing designations upon a sensitized photographic element while contained in a picture taking camera or holder having a definite picture taking field, consisting in manually writing a designation upon a translucid member, placing the portion of said member bearing the writing within the picture field and admitting light to the sensitized element through said member from a light source other than that covering the picture taking field.

47. The method of producing designations upon a sensitized photographic element while contained in a picture taking camera embodying a lens and having a definite picture taking field of exposure, consisting in manually writing a designation upon a translucid member, placing the portion of the member bearing the writing in proximity to the element and within the picture taking field, but protected from light passing through the lens, and exposing the respective parts of the element to light from separate sources, one part through the lens to the picture area and the other through the member bearing the writing.

48. A casing having a controllable exposure opening and within which casing a sensitized photographic element may be protected from light and held in position for exposure, said casing being provided with a translucid member through which light may be transmitted to print upon a sensitized element thus positioned, said member having a surface which is adapted to receive an inscription differing in light transmitting properties from the remainder of said surface, means whereby light may be admitted through said exposure opening to take a picture on said element, and separately controllable means whereby light may be admitted through said inscribed member to light print its inscription on said element.

49. A camera having means for holding a sensitized element in position for exposure therein, a light-admitting tube so mounted in said camera as to be movable toward and away from the sensitized element thus held, means for thus moving said tube, means for controlling the admission of light to said tube and an inscription-receiving plate mounted in said tube and adapted to coöperate with said sensitized element for light printing the inscription thereon.

50. A photographic camera having means for holding a sensitized element in position for exposure therein, a tubular member in the camera having a light-admitting opening in one end thereof and carrying a translucid, inscription-receiving plate, said member being movable so as to bring said plate into and out of printing relation to said sensitized element, and means to control the admission of light into said tubular member.

51. A camera having means for holding a sensitized element in position for exposure therein and provided with a passageway opening outside the camera, a tubular member adapted to admit light at one end and carrying a translucid, inscription-receiving plate, said member being movable in said passageway so as, in one position, to bring said plate into light-printing relation to the sensitized element, and, in another position, to render the plate accessible outside the camera, means whereby, when the tubular member is moved into the last-named position, the passageway in which it is movable will be automatically closed against the admission of light therethrough to the sensitized element, and means to control the entrance of light into said tubular member.

52. A camera having in addition to its usual coöperating parts, an opening and the following elements: a frame impervious to light adapted to slide into said opening, a translucent tablet supported by the portion of the frame within the camera, and adapted to receive an inscription and to be moved into printing relation with a part of the sensitized member, means wholly within the camera which automatically prevent the entrance of light through said opening upon the removal of the frame, and light controlling devices which independently control the admission of light to and through the translucent tablet.

53. A camera having in addition to its usual coöperating parts, an opening and the following elements: a frame impervious to light adapted to slide into said opening, a translucent tablet supported on the inner end of the frame, adapted to receive an inscription and to be moved into printing relation with a part of the sensitized side of the sensitive element, means wholly within the camera to prevent the entrance of light through the opening upon the removal of the frame, and light admitting devices which independently control the admission of light to and through the translucent tablet.

54. A camera having, in addition to its usual coöperating parts, an opening, and the following elements: a frame impervious to light adapted to slide into said opening and to fill the same so as to prevent the passage of light through said opening, a translucent tablet supported on said frame, adapted to receive an inscription and to be moved into printing relation with a part of the sensitive member, means wholly within the camera which automatically prevent the entrance of light through the opening upon the removal of the frame, and light admitting devices which independently control the admission of light to and through the translucent tablet.

55. A camera having in addition to its usual coöperating parts, an opening, and the following elements: an automatically acting closure for said opening, a frame impervious to light adapted to slide into said opening, the construction and arrangement of the automatic closure and of the frame being such that one supplements the other to prevent the passage of any light through said opening, a translucent tablet supported on the frame and adapted to receive an inscription and to be moved into printing relation with a part of the sensitive element when the frame is inserted in said opening, means for preventing the passage of light through the tablet during the movements of the frame, and light admitting means separate and distinct from the shutter of the camera and also from said automatic closure of the frame opening and which control the passage of light to and through the tablet for the printing of the inscription on the sensitive element.

56. A camera having an opening in its side communicating with the space in front of the focal plane, a frame impervious to light adapted to slide into said opening, a translucent inscription plate supported on said frame, automatic closing means controlled by the movements of the frame and which supplement the latter to prevent the entrance of light through said opening, means for preventing the passage of light through the tablet during the movements of the frame and light-admitting means which control the passage of light to and through the tablet for the printing of the inscription on the sensitive element.

57. The combination with a holder for photographic sensitized material having means for supporting a sensitized element for exposure therein and having an opening in its side adjacent the element, of a member for directing light to a limited area of the element, comprising a light transmitting tubular portion, having opaque walls and movable through the opening in the holder without admitting light around it, said member having an aperture inside the holder adjacent the element and a movable closure for controlling the passage of light through the member.

58. In combination with means for holding a sensitized element for exposure, an autographic attachment therefor comprising a strip of translucid material adapted to have an inscription made thereon, and a sleeve slidably insertible into the holding means for supporting said strip immediately in front of said element and within the field of exposure whereby, upon exposure, a record is simultaneously made on said element of the inscription and the object photographed.

59. A photographic camera adapted to hold a sensitized element and having an autographic attachment adapted to be supported within the exposure field in front of the sensitized element and within the field of exposure and to be slidably inserted and removed, said strip having a portion to protect the record from rubbing contact with the adjacent parts and means for preventing the sensitized element from being light struck when the attachment is removed.

60. A photographic camera adapted to hold a sensitized element for exposure and having an autogrophic attachment slidably inserted in front of said sensitized element and within the field of exposure, said attachment including a translucid strip adapted to receive an inscription thereon whereby, upon exposure, a record is simultaneously made on said element of the inscription and the object photographed.

61. The combination of a photographic camera, adapted to have a sensitized element or elements therein, and a removable autographic attachment, said autographic attachment comprising a strip of translucid material adapted to receive a record and a flattened sleeve adapted to receive the strip, said sleeve having portions of its flat sides cut away to expose parts of said strip, said camera having a slot in the side of its frame into which said sleeve is adapted to slide, the slot being so positioned as to hold the sleeve with its strip in a suitable position with respect to said sensitized element and within the field of exposure whereby, upon exposure, a record is simultaneously made on said element of the record on the strip and the object photographed.

Signed at New York city, in the county of New York and State of New York, this 10th day of September, A. D. 1912.

HENRY J. GAISMAN.

Witnesses:
T. F. BOURNE,
MARIE F. WAINRIGHT.